Nov. 5, 1968   J. R. ROGERSON   3,408,926
FISH PACKING MACHINE
Filed Oct. 14, 1966   5 Sheets-Sheet 1
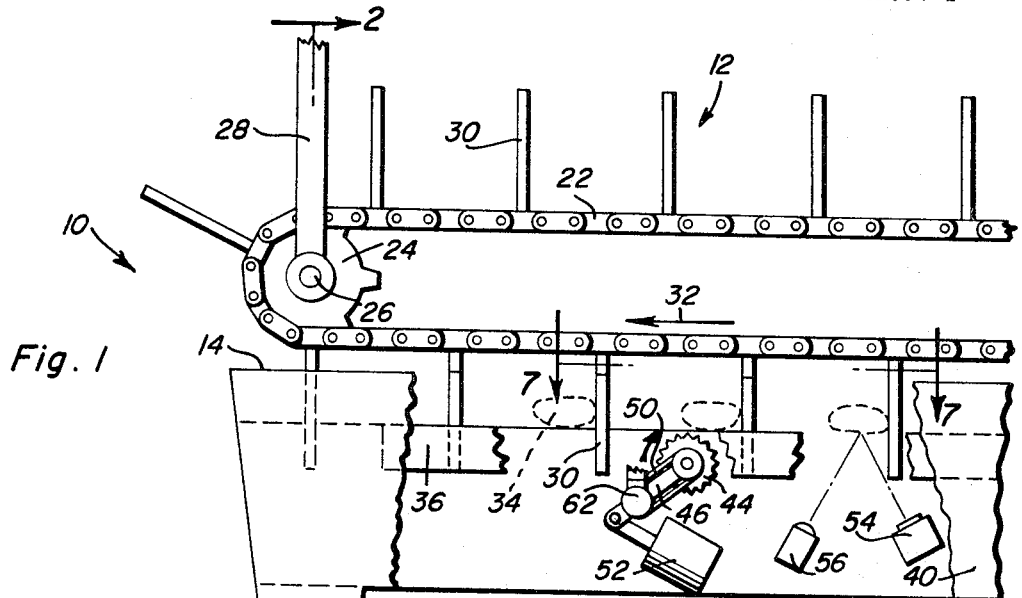
Fig. 1
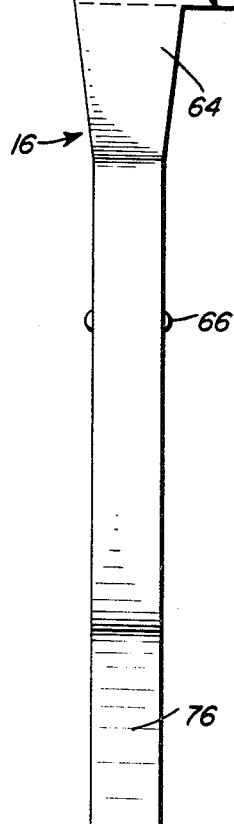
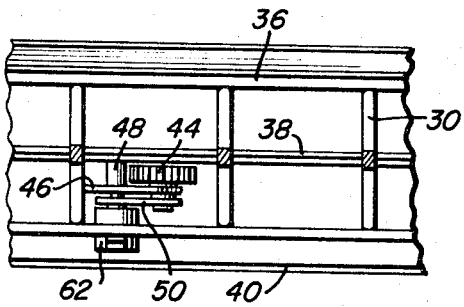
Fig. 7
John R. Rogerson
INVENTOR.
BY Clarence A. O'Brien
and Harvey B. Jacobson
Attorneys

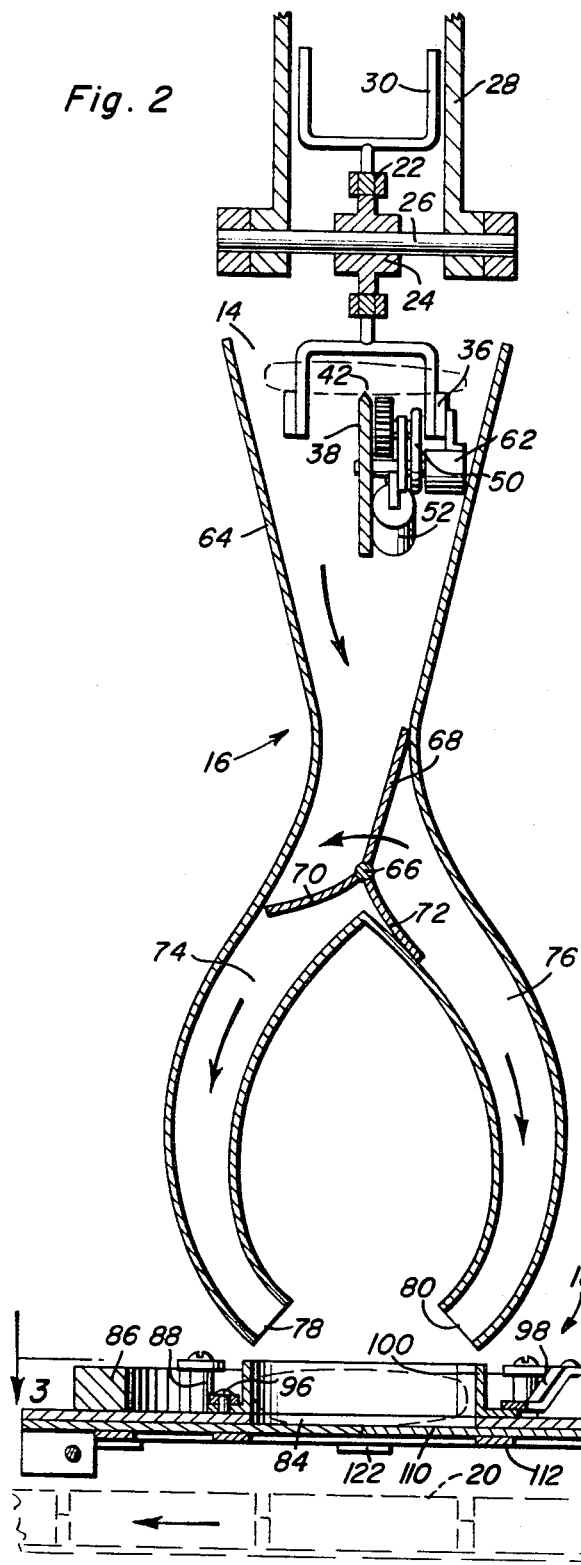
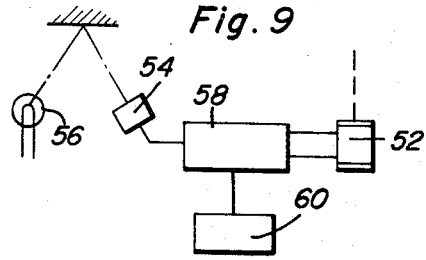
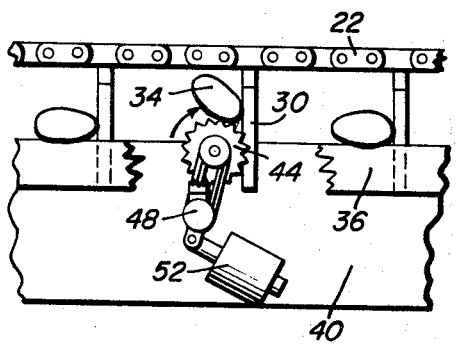

Nov. 5, 1968   J. R. ROGERSON   3,408,926
FISH PACKING MACHINE
Filed Oct. 14, 1966   5 Sheets-Sheet 3

John R. Rogerson
INVENTOR.

BY Clarence A. O'Brien
and Harvey B. Jacobson
Attorneys

Nov. 5, 1968　　　J. R. ROGERSON　　　3,408,926
FISH PACKING MACHINE
Filed Oct. 14, 1966　　　　　　　　　　5 Sheets-Sheet 4

John R. Rogerson
INVENTOR.

Nov. 5, 1968    J. R. ROGERSON    3,408,926
FISH PACKING MACHINE

Filed Oct. 14, 1966    5 Sheets-Sheet 5

John R. Rogerson
INVENTOR.

BY *Clarence A. O'Brien*
*and Harvey B. Jacobson*
Attorneys

United States Patent Office 3,408,926
Patented Nov. 5, 1968

3,408,926
FISH PACKING MACHINE
John R. Rogerson, P.O. Box 10, Leonardville,
New Brunswick, Canada
Filed Oct. 14, 1966, Ser. No. 586,717
10 Claims. (Cl. 100—49)

ABSTRACT OF THE DISCLOSURE

Fish delivered in random orientation to a conveyor are orientated and deposited by the conveyor into a chute from which the fish exit into a molding device. A predetermined number of fish are received in the molding device during its incremental advancement relative to the chute at which point the device is triggered into operation. The same numbers of fish are thereby compressed and transferred to containers moving along a production line.

---

This invention relates to the packaging of fish such as sardines and herrings in a novel and efficient manner.

The present invention pertains to apparatus for packaging fish which has been delivered to the apparatus in a disorientated fashion. In order to package a constant quantity of fish within containers of predetermined sizes, it is necessary that the fish be received within the containers in a controllably orientated manner. Accordingly, a major object of the present invention is to insure that the fish delivered to the apparatus are placed in the container in proper position so as to pack a predetermined number of fish within each container.

In accordance with the foregoing object, the apparatus of the present invention features a conveyor receiving the fish in a horizontal position. The movement imparted to the fish aligns them in parallel spaced relation to each other transverse to the direction of movement. During such movement, facilities are provided so as to insure that all of the fish are supported on the same horizontal side. Thus, the fish are conveyed to the upper inlet end of a gravity chute into which they are deposited with the heavy ends down so that all of the fish enter the chute in the same vertically orientated position. The gravity chute is operative to horizontally reposition the fish after being vertically orientated. The fish are thus deposited by the gravity chute into a molding device with the head and tail ends alternately staggered. The molding device is then operative to compress a predetermined number of fish to a predetermined size so that they may be deposited into a container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view with parts broken away showing a portion of the fish packing machine to which the present invention pertains.

FIGURE 2 is a front sectional view taken substantially through a plane indicated by section line 2—2 in FIGURE 1.

FIGURE 7 is a partial sectional view taken substantially through a plane indicated by section line 7—7 in FIGURE 1.

FIGURE 8 is a partial side elevational view with parts broken away of a portion of the machine as shown in FIGURE 1 in a different operational phase.

FIGURE 9 is a simplified control circuit diagram corresponding to the apparatus associated with the fish turning mechanism illustrated in FIGURE 8.

Figure 3:
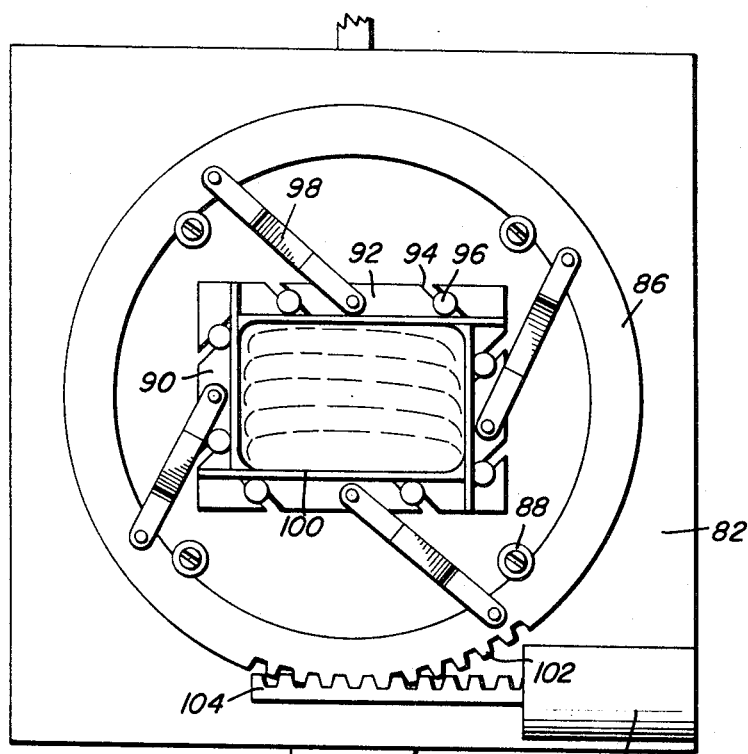
FIGURE 3 is a partial top sectional view taken substantially through a plane indicated by section line 3—3 in FIGURE 2.

Referring now to the drawings in detail, FIGURE 1 shows the fish packing apparatus to which the present invention pertains which includes a fish orientating conveyor assembly generally referred to by reference numeral 12 the delivery end of which is positioned above the upper inlet end 14 of a gravity chute assembly 16. Fish delivered to the loading end (not shown) of the conveyor 12 from a sizer will be conveyed and delivered to the gravity chute assembly from which the fish emerge and are deposited within a fish molding mechanism generally referred to by reference numeral 18. Thus, a predetermined number of fish are compressed to a predetermined size by the molding mechanism 18 so that they may be deposited into containers 20 such as shown by dotted line in FIGURE 2. When loaded, each container is conveyed away from the station at which the fish are compressed by the molding mechanism.

Referring now to FIGURES 1 and 2, it will be observed that the conveyor 12 includes an endless sprocket chain 22 entrained about the sprocket wheel 24 at the delivery end. The sprocket wheel is rotatably supported by the shaft 26 which is fixedly positioned above the upper inlet end of the chute assembly by the supports 28 for example. Connected to the endless sprocket chain 22 in equal spaced relation to each other, are pairs of fish moving fingers 30 which are transversely spaced from each other. It will be apparent therefore, that the fish moving fingers extend downwardly from the lower run of the endless sprocket chain which is moving toward the delivery end as indicated by the arrow 32 in FIGURE 1 so as to displace fish 34 horizontally supported between the side rails 36 and a center rail 38. The side and center rails are therefore fixedly supported in parallel spaced relation to each other between side walls 40, the side walls 40 extending rearwardly from the gravity chute assembly 16. Also, the center rail 38 extends forwardly beyond the side rails 36 into the upper inlet end of the chute assembly so that the fish displaced by the fingers 30 into the inlet end of the chute will pivot downwardly on the supporting pivot edge 42 of the center rail. It will therefore be apparent that the fish will be unbalanced on the supporting pivot edge 42 so that the heavier or head ends will drop downwardly to thereby vertically orientate all of the fish in the same direction. It is essential however that all fish approaching the chute be supported by the rails belly side up so that all the fish descending the chute will be orientated the same way.

Referring now to FIGURES 1, 7, 8 and 9, it will be observed that a peripherally serrated turning wheel 44 is supported below the supporting edges of the rails 36 and 38 by means of a lever member 46 angularly displaceable about a fixed pivot shaft 48. The turning wheel 44 is also constantly rotated through a belt drive 50 but is normally held just below the upper supporting edges of the rails 36 and 38 as shown in FIGURE 1. Should any of the fish 34 be supported on the rails back side up, the rotating turning wheel 44 is angularly displaced upwardly by means of the power operated solenoid 52 connected to the lever member 46 in order to engage and turn the fish as shown in FIGURE 8. The solenoid 52 is energized for this purpose whenever the belly side of the fish is detected by a photocell detector 54 mounted rearwardly of the turning wheel as shown in FIGURE 1. Thus, the detector 54 is fixedly positioned at an angle to receive reflections from the belly surface of any fish supported by the rails back side up. A lamp 56 is therefore also fixedly positioned at the proper angle below the rails in order to produce the beam of light reflected from any improperly positioned fish. An improperly positioned fish will have a light reflective bellysurface as diagrammatically shown in FIGURE 9 from which the beam of light is sensed by the detector 54. The detector is operative through a control circuit 58 to energize the solenoid device 52 after a predetermined delay period controlled by a timer 60 that is set in accordance with the spacing of the detector from the turning wheel 44 and the speed of the conveyor 12 so that the turning wheel is displaced upwardly into engagement with the fish for turning thereof and is then withdrawn before the next fish approaches the position of the turning wheel. As more clearly seen in FIGURE 2, the turning wheel is constantly rotated through the belt drive 50 by a motor 62.

The gravity chute assembly 16 as shown in FIGURE 2, includes a downwardly converging portion 64 within which the vertically orientated fish are received head end down. Pivotally mounted by the pivot shaft 66 intermediate the upper and lower ends of the chute assembly, is a direction changing valve member including the blade 68 and a pair of diverging vanes 70 and 72 respectively projecting into the arcuate conduit sections 74 and 76. It will be apparent therefore that a fish received within the upper portion of the chute assembly will be directed into the conduit section 74 by the blade 68 in the position illustrated. As the fish enters the conduit section 74 it displaces the vane 70 so as to pivotally displace the valve member to its other operative position in order to direct the next fish into the conduit section 76. Fish will therefore emerge head first alternatively from the outlet ends 78 and 80 of the chute assembly and be deposited into the molding device 18 in horizontal positions.

Figure 4:
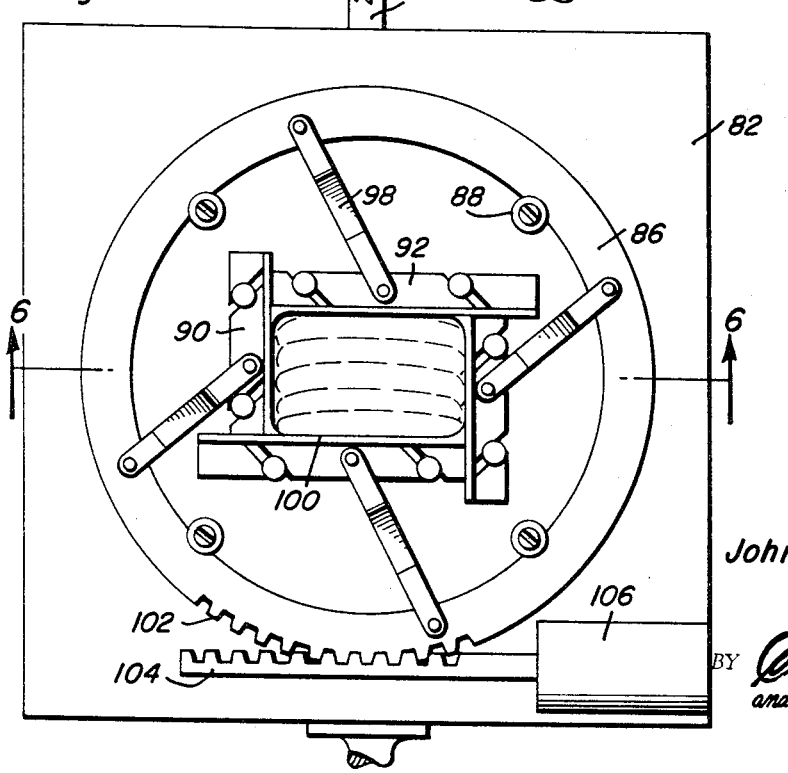
FIGURE 4 is a sectional view similar to FIGURE 3 but showing the apparatus in a different operational phase.
Figure 6:
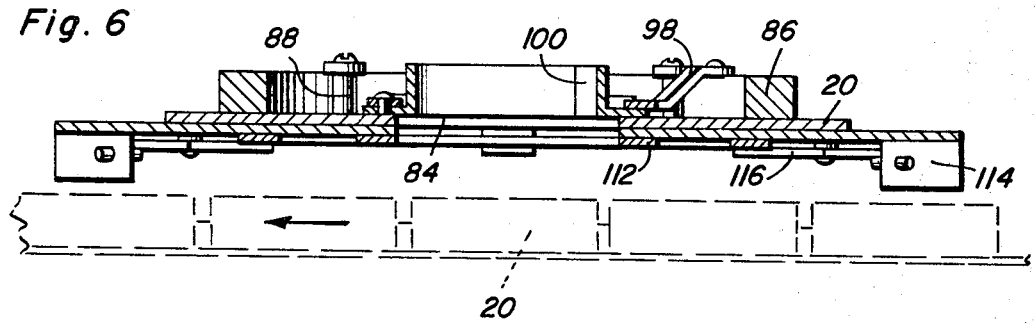
FIGURE 6 is a transverse sectional view taken substantially through a plane indicated by section line 6—6 in FIGURE 4.

Referring now to FIGURES 1, 2 and 3, it will be observed that the molding device is fixedly positioned in spaced relation below the lower outlet ends of the chute assembly by means of a horizontal movable plate 82 having an opening 84 therein. The opening 84 is centrally disposed within an annular ring member 86 angularly mounted on the plate 82 by means of a plurality of rollers 88. The opening 84 in the plate is also framed by two pairs of parallel spaced side frame members 90 and 92 where the opening is rectangular in shape. Each side frame member is provided with a pair of diagonal guide slots 94 receiving upwardly projecting guide pins 96 connected to the plate 82. The side frame members 90 and 92 are pivotally connected by links 98 to the annular ring member 86 so that angular displacement of the member 86 will slidably displace the side forming members 90 and 92 toward or away from each other. As shown in FIGURE 3, the vertical walls 100 of the side forming members are in an expanded position framing the opening 84 so as to form an enlarged space within which a predetermined number of horizontally repositioned fish are received from the chute assembly as hereinbefore explained. The plate member 82 is therefore incrementally advanced by means of a suitable incremental drive mechanism to which it is connected by rod 83 from one limit position to another below the outlet end of the chute assembly until a predetermined number of fish are deposited within the expanded volume of the molding device. The annular ring member 86 is then angularly displaced by a predetermined amount in order to contract the side forming members to the position shown in FIGURES 4 and 6. Toward this end, a portion of the annular member 86 may be provided with gear teeth 102 in mesh with the teeth on the rack 104 connected to the armature of a power operated solenoid device 106 mounted on the plate 82. Thus, when the solenoid device 106 is energized, the fish received by the molding device will be compressed to a predetermined size corresponding to the containers 20 into which the fish are deposited.

Figure 5:
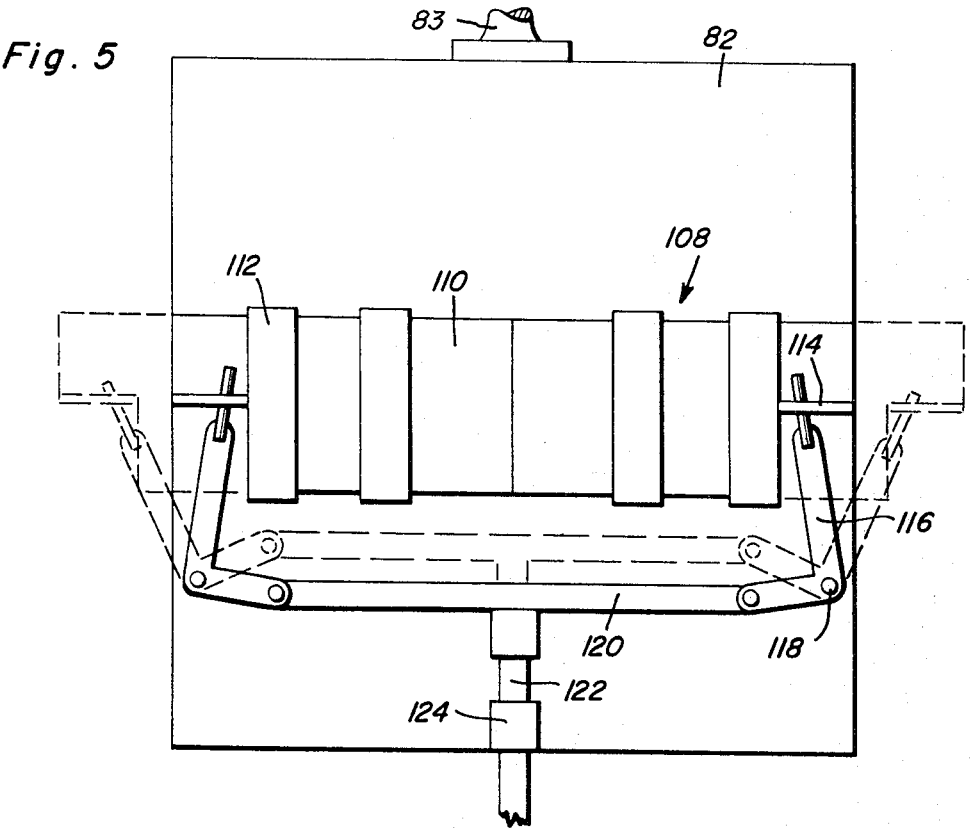
FIGURE 5 is a bottom plan view of the portion of the apparatus shown in FIGURE 3.

During reception of the fish within the expanded molding device and during compression thereof to the predetermined size corresponding to the containers, the fish are prevented from dropping through the opening 84 by a gate mechanism 108 as more clearly seen in FIGURE 5. The gate mechanism includes therefore a pair of gate members 110 slidably mounted below the plate 82 by the guides 112. The remote ends of the gate members are provided with projections 114 to which the lever elements 116 are connected, the lever elements being pivotally mounted below the plate 82 by pivots 118. Both of the lever elements 116 respectively associated with the gate members 110 are interconnected by a link 120 to which a reciprocal slide rod 122 is connected, the rod 122 being slidably mounted by the guide 124 below the plate 82. Thus, power operated means will be provided to displace the gate members and the actuating linkage between the solid line closed position shown in FIGURE 5 to the dotted line open position in order to permit deposit of the compressed fish from the molding device into a container 20 positioned in alignment below the opening 84.

Figure 11:
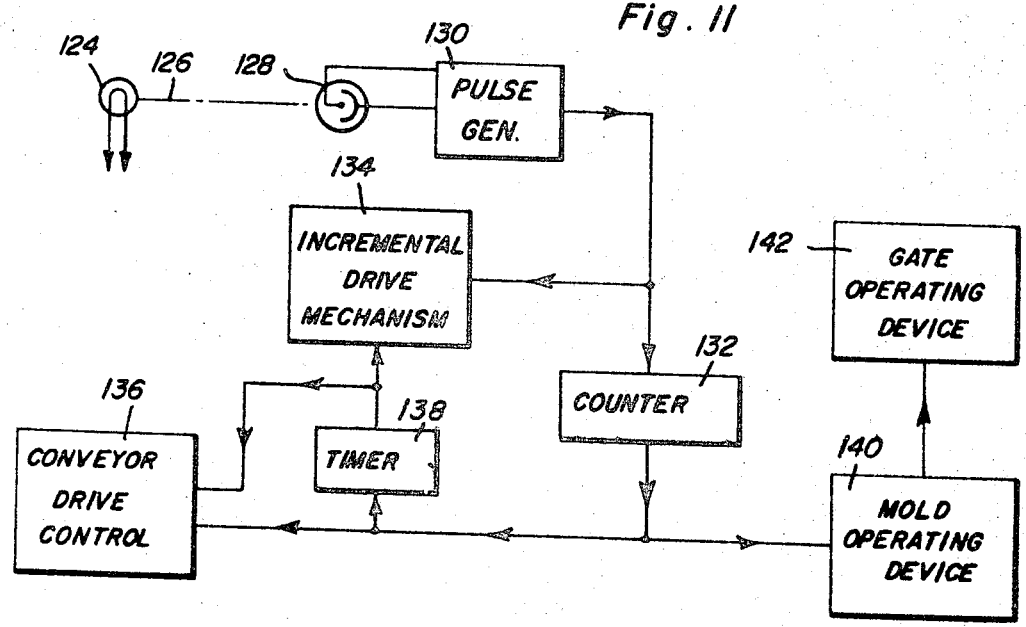
FIGURE 11 is a simplified control system diagram associated with the machine of the present invention.

Operation of the various components of the machine hereinbefore described must be synchronized by a suitable control system. For example, as shown in FIGURE 11 a lamp 124 may be provided establishing a beam 126 interrupted by each fish as it emerges from the outlet of the chute assembly 16 into the expanded molding device. Interruption of the beam will be sensed by a photocell detector 128 operatively connected to a pulse generator 130 through which a counting pulse is dispatched to a counter 132. Each counting pulse so generated will be operative on the aforementioned incremental drive mechanism diagrammatically shown and labeled by reference numeral 134 in FIGURE 11 in order to advance the plate member 82 by a small amount as hereinbefore indicated. When a predetermined number of fish are received within the molding device, the counter 132 will dispatch a signal to the conveyor drive control 136 in order to stop movement of the conveyor 12 for a predetermined period of time determined by the timer 138 which will also be operative on the incremental drive mechanism 134 in order to restore the molding device to its initial position. When the molding device is returned to its initial position, at the end of the timing cycle of the timer 138, operation of the conveyor 12 is resumed through the conveyor drive control.

The signal pulse which initiates the time cycle of the timer 138 and stops operation of the conveyor also energizes the solenoid 106 through the mold operating device 140 in order to compress the fish to the predetermined size of the associated container. Upon completion of the compression stroke, the gate mechanism 108 is operated by the gate operating device 142 to open the gate members for a sufficient length of time to insure that the fish are deposited within the container and then closed once again in order to start a new cycle.

Figure 10:
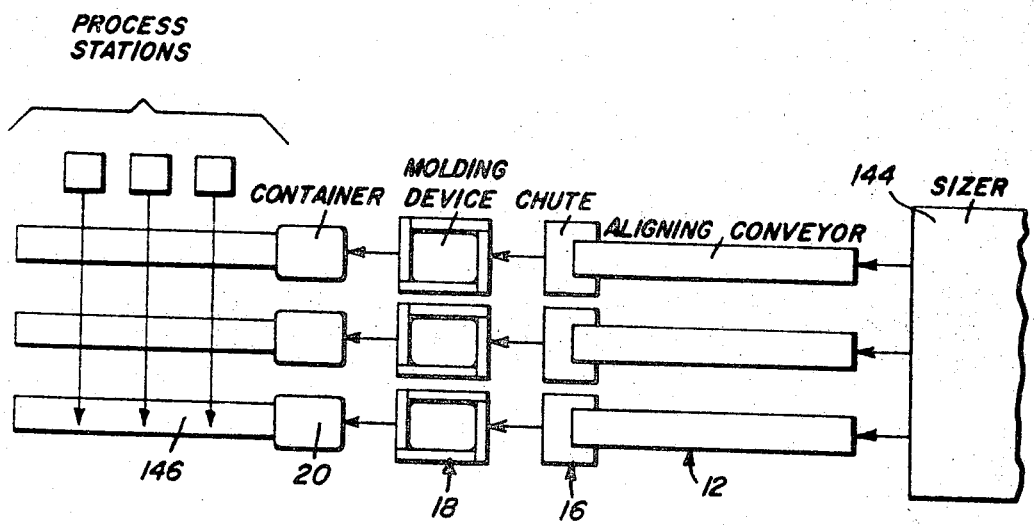
FIGURE 10 is a schematic work flow diagram corresponding to the machine of the present invention.

It will be apparent therefore, that the apparatus of the present invention makes possible complete automatic handling of fish for packaging and processing. As diagrammatically shown in FIGURE 10, a plurality of aligning conveyors such as hereinbefore described in connection with conveyor 12, may be provided in order to handle fish of different sizes received from the sizer 144. Thus, each conveyor will deposit fish of a different size into a chute assembly 16 from which the fish emerge and are received within the molding devices 18. Each moulding device may therefore deliver fish of different sizes for packaging in containers 20 carried by the process line conveyors 146 through different process stations where the fish are sealed, sterilized, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fish packing machine, a molding device adapted to receive a predetermined number of fish, a delivery chute having outlet portions discharging said fish in opposite directions into the molding device, and orientating conveyor means for delivering said fish to the delivery chute vertically orientated in the same direction.

2. The combination of claim 1 wherein said molding device comprises, a plate having an outlet opening therein, a plurality of side forming elements movably mounted by said plate in sliding engagement with each other, an annular control member angularly displaceable about said side forming elements, link means operativley connecting said control member to the side forming elements for displacement thereof between an expanded position and a contracted position peripherally bounding said opening in the plate, and gate means for closing said opening in the plate until the side forming elements are in said contracted position.

3. The combination of claim 2 wherein said conveyor means includes an elongated pivot rail and a plurality of side rails parallel spaced therefrom for transversely supporting said fish on upper edges thereof and an endless drive belt having a plurality of transversely spaced fingers projecting downwardly between said rails for movement of the fish toward the delivery chute, said pivot rail projecting longiutdinally beyond the side rails into the delivery chute, whereby said fish are vertically orientated in the same direction when pivoting downwardly into the chute from the projecting pivot rail.

4. The combination of claim 3 including rotating wheel means movably mounted between said rails below the upper edges thereof, and detector means operatively connected to the wheel means for displacement thereof into engagement with the fish during movement by the fingers along the rails.

5. The combination of claim 1 wherein said conveyor means includes an elongated pivot rail and a plurality of side rails parallel spaced therefrom for transversely supporting said fish on upper edges thereof and an endless drive belt having a plurality of transversely spaced fingers projecting downwardly between said rails for movement of the fish toward the delivery chute, said pivot rail projecting longitudinally beyond the side rails over the delivery chute, whereby said fish are vertically orientated in the same direction when pivoting downwardly into the chute from the projecting pivot rail.

6. The combination of claim 5 including rotating wheel means movably mounted between said rails below the upper edges thereof, and detector means operatively connected to the wheel means for displacement thereof into engagement with the fish during movement by the fingers along the rails.

7. In a fish packing machine, a molding device comprising, a plate having an outlet opening therein, a plurality of side forming elements movably mounted by said plate in sliding engagement with each other, an annular control member angularly displaceable about said side forming elements, link means operatively connecting said control member to the side forming elements for displacement thereof between an expanded position and a contracted position peripherally bounding said opening in the plate, and gate means for closing said opening in the plate until the side forming elements are in said contracted position.

8. In a fish packing machine, an orientating conveyor for movement of fish to a delivery chute comprising, an elongated pivot rail and a plurality of side rails parallel spaced therefrom for transversely supporting said fish on upper edges thereof and an endless drive belt having a plurality of transversely spaced fingers projecting downwardly between said rails for movement of the fish toward the delivery chute, said pivot rail projecting longitudinally beyond the side rails into the delivery chute, whereby said fish are vertically orientated in the same direction when pivoting downwardly into the chute from the projecting pivot rail.

9. The combination of claim 8 including rotating wheel means movably mounted between said rails below the upper edges theroef, and detector means operatively connected to the wheel means for displacement thereof into engagement with the fish during movement by the fingers along the rails.

10. In a fish packing machine, conveyor means for moving fish while horizontally disorientated along a predetermined path toward a delivery end, means responsive to pivotal unbalance of the fish at said delivery end for vertically orientating the fish in the same direction, gravity operated chute means for horizontally repositioning the vertically orientated fish, and container conditioning means receiving a predetermined number of said horizontally repositioned fish from the chute means.

References Cited

UNITED STATES PATENTS

| 235,128 | 12/1880 | Cook | 198—68 XR |
| 2,064,965 | 12/1936 | Will. | |
| 3,089,410 | 5/1963 | Stangl | 100—215 |

FOREIGN PATENTS

| 1,037,281 | 7/1966 | Great Britain. |
| 36,268 | 11/1922 | Norway. |

BILLY J. WILHITE, *Primary Examiner.*